March 27, 1934.   P. VAN S. KOLFF   1,952,991
RECORDER
Filed June 11, 1930   3 Sheets-Sheet 1
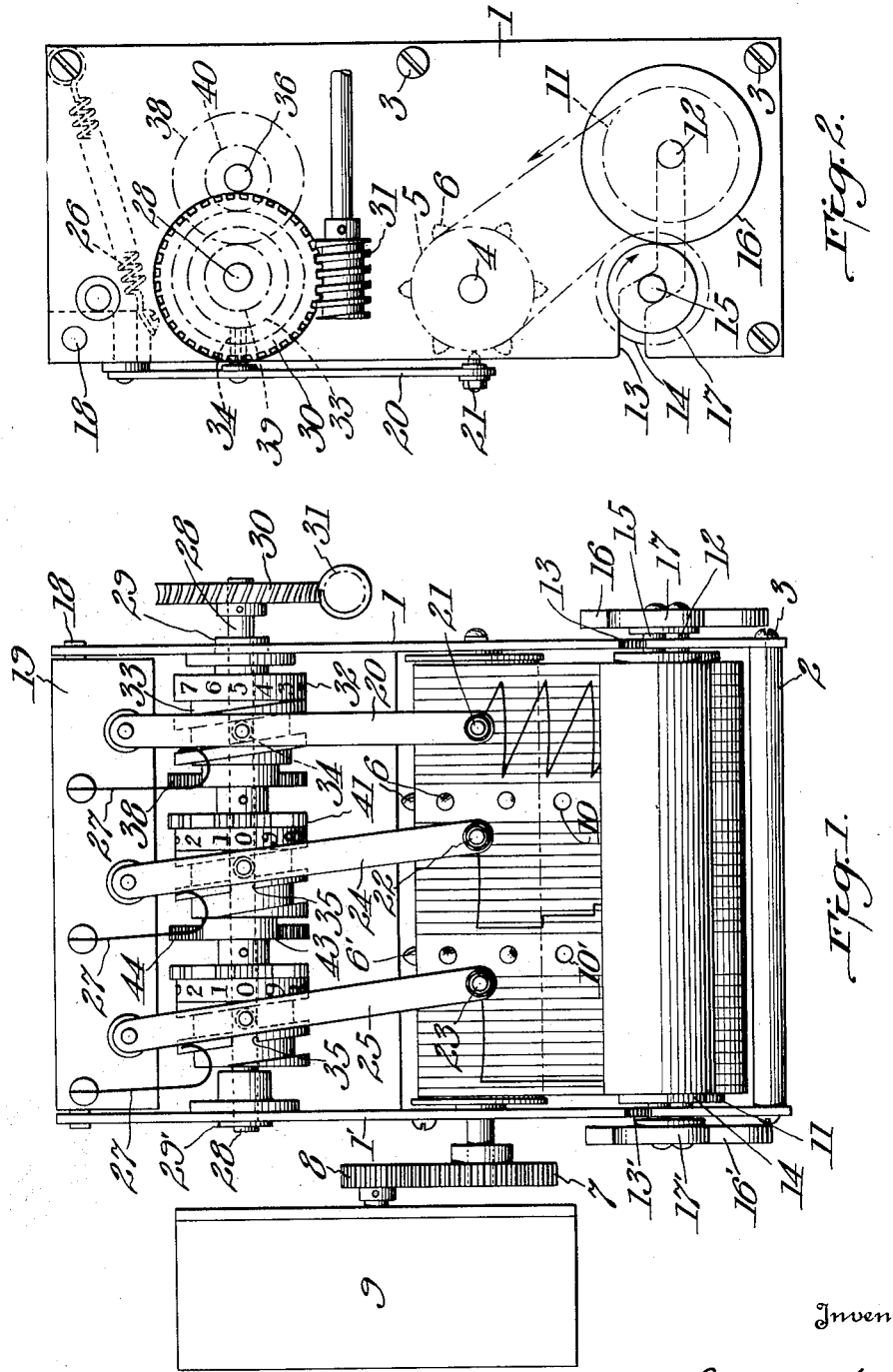

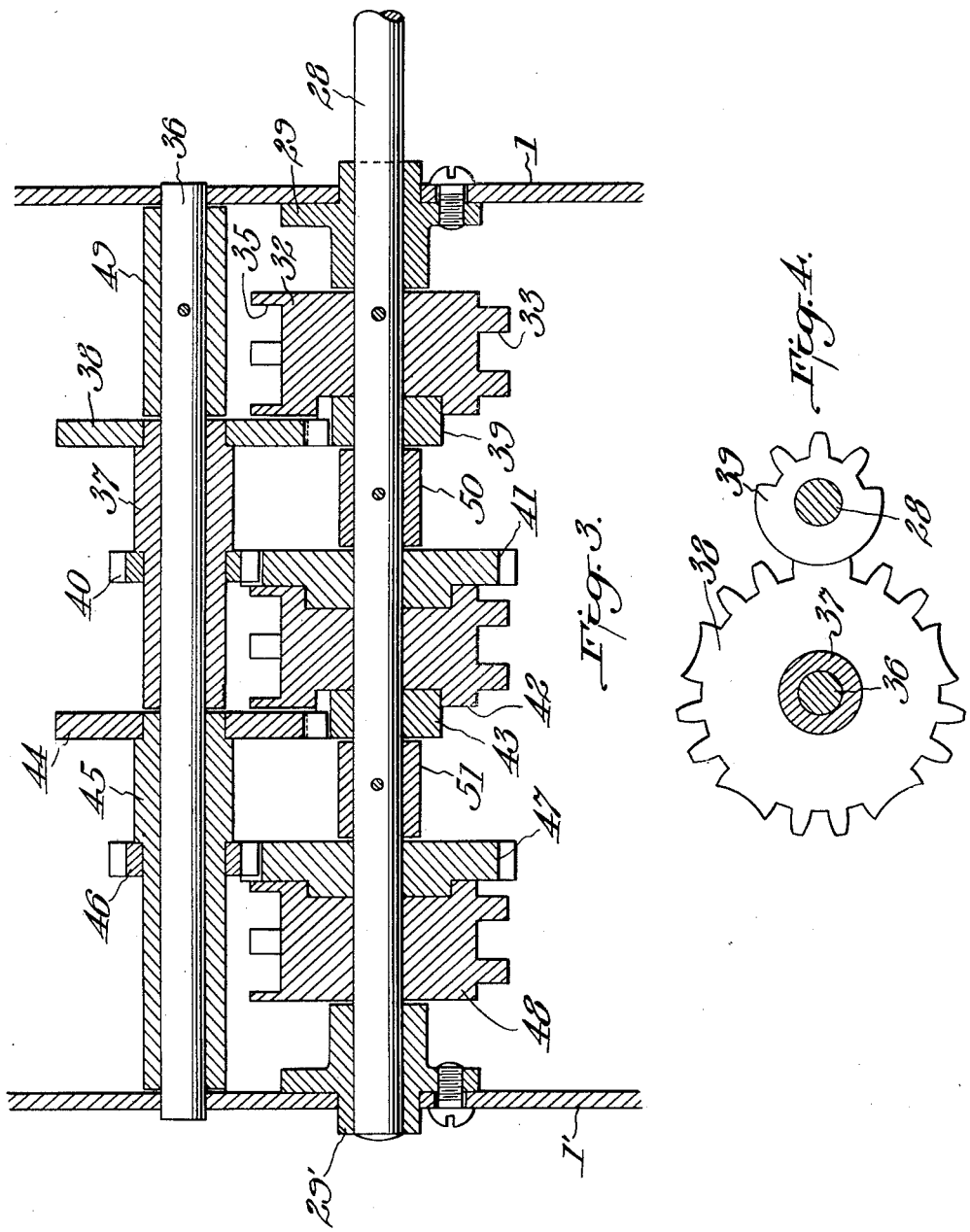

March 27, 1934. P. VAN S. KOLFF 1,952,991
RECORDER
Filed June 11, 1930  3 Sheets-Sheet 3

Inventor:
Petrus Van Santen Kolff,
By Byrnes Townsend & Potter,
Attorneys.

Patented Mar. 27, 1934

1,952,991

UNITED STATES PATENT OFFICE 1,952,991

RECORDER

Petrus van Santen Kolff, Philadelphia, Pa.

Application June 11, 1930, Serial No. 460,498

13 Claims. (Cl. 234—30)

This invention relates to a recorder and particularly to a recorder of the type in which a movement characteristic of the operation of a machine is represented by the tracing of a line or lines upon a moving record sheet or chart.

An object of the invention is to provide a numerical and graphic recorder which combines certain advantages of a totalizing counter or recording counter and of the graphic type of recorder which traces a variable curve showing a variable function on a time or other suitable basis. A further object of the invention is to provide a recording counter which will trace a number of record curves that are related to each other, on a decimal or other suitable numerical basis; the unit record curve being on such a scale as to afford an indication of the rate of change of the function or characteristic that is being recorded, and the additional record curves constituting a graphic totalizing of changes in that function.

Another object of the invention is the provision of a recorder for a vehicle, which recorder will continuously record a curve from which may be determined, for any instant of time, the velocity of the vehicle, the time and distance along the road when said velocity was attained, the stops made by the vehicle, the time and distance along the road at which such stops occurred, and the total distance traveled by the vehicle.

Another object of the invention is to provide a recording counter which is simple and strong in construction and which operates in a positive and accurate manner.

The invention is shown in the drawings wherein:—

Fig. 1 is a front elevational view of the recording counter with the casing removed.

Fig. 2 is a side elevational view of the device shown in Fig. 1.

Fig. 3 is an enlarged detailed view in cross section of the mechanism for operating the styli.

Fig. 4 is a view of a constructional detail.

Figure 5:
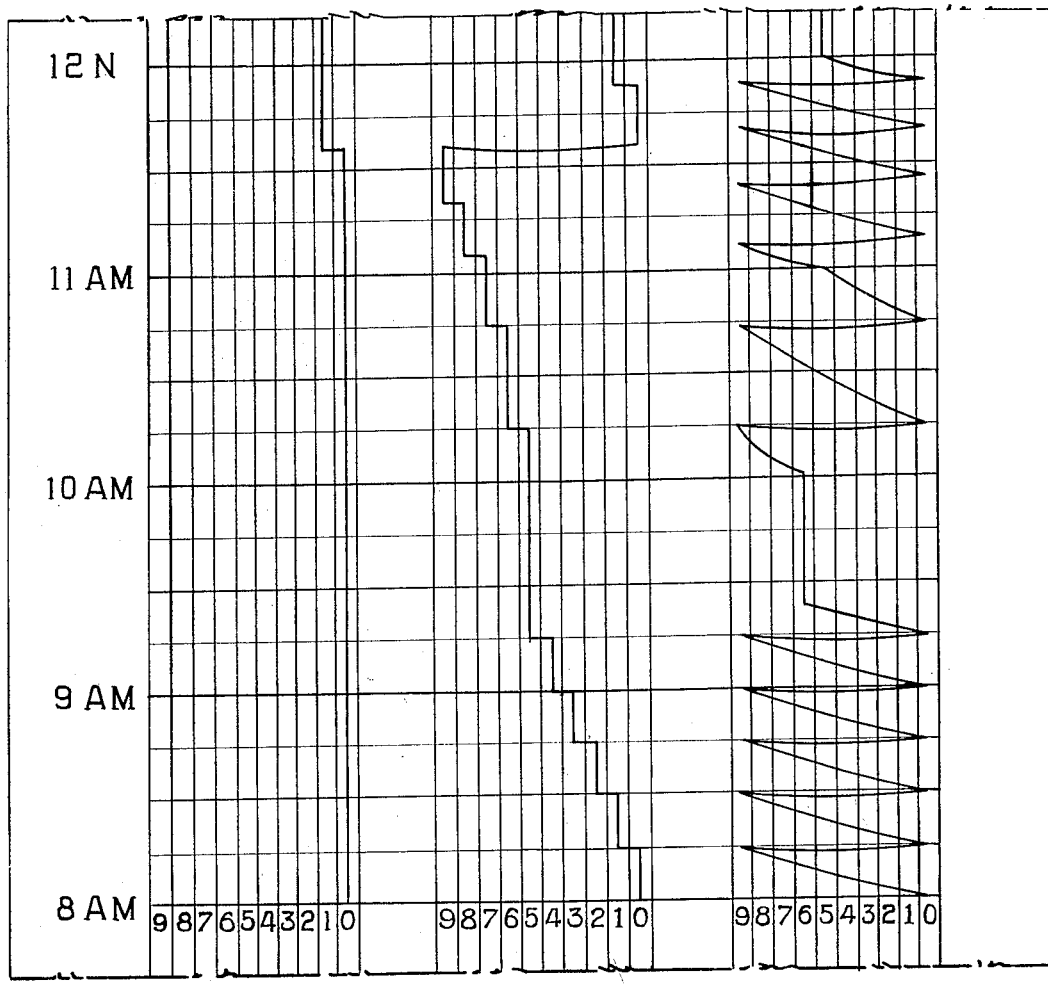
Fig. 5 is a view showing a portion of a record strip, with a record curve traced thereon.

A pair of substantially rectangular side plates 1, 1' are held in spaced, parallel relation by means of pillars 2, secured to the plates by screws 3. A shaft 4 mounted between the side plates 1, 1', carries a feed drum 5, provided with two sets of sprockets 6, 6'. One end of the shaft projects beyond the side plate 1' and carries a gear wheel 7, which meshes with a pinion 8, of a clockwork mechanism 9.

Wound over the feed drum 5, is an elongated strip of paper having two longitudinal rows of perforations 10, 10', arranged to fit over the teeth 6, 6' of the sprockets whereby rotation of the drum 5 positively moves the strip. A supply drum 11, upon which is wound the unmarked portion of the strip, is rotatably mounted on a shaft 12, carried in slots 13, 13' in the side frames 1, 1'. A collecting drum 14, upon which is wound the portion of the strip bearing the record curve, is mounted on a shaft 15, in a manner similar to the supply drum 11. It will be noted that the provision of the slots in the side plates permits the easy removal of the drums when it is necessary to replace the strip.

The supply drum shaft 12, carries at each end a slip-friction wheel 16, 16'. Similar slip-friction wheels 17, 17' are carried by the ends of the collecting drum shaft 15 and are arranged to bear respectively upon the first pair of friction wheels whereby rotation of the supply drum shaft 12, will effect rotation of the collecting drum shaft 15, to wind the strip on the collecting drum as the strip is unwound from the supply drum 11. This friction connection between the supply drum 11 and collecting drum 14, permits the drums to rotate at the proper relative rates of rotation as the size of the roll of paper on each drum changes, thereby maintaining the strip under a substantially uniform tension and preventing tearing or buckling of the strip.

Carried on a trunnion 18, mounted in the side plates 1, 1', at their upper portions is a stylus arm support 19. A stylus arm 20, is pivotally connected at its upper end to the support and carries at its lower end a stylus 21, arranged to bear against the strip where it passes over the feed drum. Two other styli 22, 23, similar to the first mentioned stylus are carried by stylus arms 24, 25, in the same manner. A spring 26, having one end connected to the stylus arm support and the other end connected to one of the pillars, is provided for the purpose of biasing the support in a counter-clockwise direction, as seen in Fig. 2, to cause the styli to bear firmly against the strip. Leaf springs 27, are mounted on the stylus arm support and urge the individual stylus arms towards their zero positions.

The strip may be formed of any kind of paper or cloth and each stylus may carry a pen for marking the strip. However, I prefer to employ a stylus having a hard metal point which stylus does not need to be filled with ink as does a pen, and which requires no care or adjustment. Where a stylus is used, the strip is formed of a specially surfaced paper. When a stylus formed of copper, copper alloy, silver or like material is made to bear upon the paper, the surface will be scraped off and the path which the stylus has traced on the paper will clearly appear.

The mechanism for actuating the styli is disposed below the support 19. A shaft 28, which extends between the side plates 1, 1', and has a portion projecting beyond one of the plates, is rotatably mounted in the side plates by means of bearing members 29, 29'. The projecting portion carries a worm wheel 30, which meshes with a worm 31, driven by some portion of the vehicle or machine, such as a wheel axle, which rotates in accordance with the movement of the vehicle. Rigidly secured to the shaft 28, is a numbered cam wheel 32, having a helically arranged groove 33, in which a roller 34, secured to the stylus arm 20, is arranged to move. A cross groove 35 connects two adjacent turns of the helical groove.

Referring to Fig. 3, wherein the actuating mechanism is shown in cross-section, a second shaft 36 is non-rotatably mounted between the sides 1, 1'. Rotatable on this shaft is a collar 37 which carries a gear 38 meshing with a pinion 39, rigidly connected to the first cam wheel 32 which cam wheel is secured to the driving shaft 28 for rotation thereby. The collar 37, which is rotatable on the stationary shaft 36, carries a pinion 40 which meshes with a gear wheel 41 secured to the second cam wheel 42, which is loosely mounted on the driving shaft 28 and to which cam wheel is attached a pinion 43. The pinion 43 meshes with a gear wheel 44 carried by a second collar 45, rotatable on the stationary shaft 36. The second collar 45 carries a pinion 46 meshing with a gear wheel 47 secured to the third cam wheel 48. Spacing collars 49, 50, 51 are provided for properly positioning the various members on their respective shafts.

The pinion 39 carried by the cam wheel 32 and its cooperating gear 38 are shown in Fig. 4. These members are intermittent gears whereby a continuous rotation of the pinion 39 causes intermittent rotation of the gear wheel 38. The pinion is provided with three teeth and the gear wheel is provided with five dwells and five interposed sets of teeth. Thus, it will be seen that the gear wheel 38 will be completely rotated in five steps by five complete revolutions of the pinion 39.

Referring to Fig. 3, the pinion 40 carried on the first collar 37 is a fully toothed gear and is provided with one half as many teeth as the gear wheel 41 with which it meshes. Thus, one revolution of the gear wheel 41 and the second cam 42, is effected by two complete revolutions of the pinion 40 or ten revolutions of the first cam. The mechanical drive between the second and third cams is similarly constructed to effect a ten to one reduction.

Thus, it will be apparent that one hundred revolutions of the shaft 28 and the first cam wheel 32 will effect twenty revolutions of the first collar 37, ten revolutions of the second cam wheel 42, two revolutions of the second collar 45 and one revolution of the third cam wheel 48. Hence, the cam wheels will bear a decimal relation to one another and consequently the movements of the styli will bear a similar decimal relation.

The operation is as follows:

The clockwork mechanism 9, acting through the gears 8, 7 cooperating with the feed drum 5, rotates the latter to draw the strip, at a uniform rate, past the styli 21, 22, 23. The strip is unwound from the supply drum 11 and the movement of the latter is transmitted by means of the friction wheels 15, 16 to the collecting drum 14, to wind the strip on the collecting drum 14 at the same rate as that at which it is unwound from the supply drum 11.

As soon as the vehicle begins to move, the cam wheel shaft 28 is rotated and carries the first cam wheel 32 around with it. The cam wheel 32 through the action of the roller 34, moving in the groove 33 provided in the cam wheel displaces the first stylus arm 20 from right to left. As the strip is continuously moving, the path followed by the stylus 21 is oblique with respect to the strip and the slope is proportional to the velocity of the stylus across the strip which, it will be apparent, is proportional to the speed of the vehicle.

When the cam wheel 32 has made one revolution, the roller 34 enters the horizontal slot 35 and the stylus arm is permitted to return to its original position, under the influence of the spring 27. This movement causes the stylus to trace a substantially horizontal path.

At the end of each revolution of the first cam 32, the intermittent gearing 39, 38, 40, 41 connecting the first and second cams 32, 42, is effective to rotate the second cam wheel 42 one tenth of a revolution. It will be seen that the second stylus arm 24 is not continuously moved to trace a zigzag path, but is moved intermittently to trace a substantially stepped path.

The third cam wheel 48 is actuated intermittently by the second cam wheel 42 in a manner similar to the actuation of the latter. Since there is a decimal relationship between the second and third cam wheels the latter is moved only one tenth as often as the former.

A further understanding of the invention may be had by reference to Fig. 5 which shows a typical record curve traced by the recorder. The strip is divided into three longitudinal portions each of which is ruled with eleven parallel, equally spaced, longitudinal lines. In the first portion, the figures represent units of one mile, in the middle portion they represent ten mile units, and in the third portion the figures represent hundred mile units.

Equally spaced transverse lines are provided on the record strip for indicating time. The lines are so spaced with reference to the speed of movement of the strip that, in the course of an hour, a portion of the strip equal to the distance between two hourly marks is drawn past the row of styli. For example, if the strip is started when the line marked "8 A. M." is under the styli, one hour later the strip would be moved sufficiently by the clockwork so that the styli will rest on the line marked "9 A. M.". The strip is so disposed with respect to the styli that, when the recorder is set at zero reading the respective styli bear upon the centers of the "0" or zero spaces. Each space is of such a width that each stylus will transverse exactly ten spaces during one revolution of the cam wheel driving the stylus. It will be noted that the extent of the transverse travel of the styli is from the center of the "0" space to the center of the "9" space, thus readings are taken at the center of the spaces instead of at the sides as is customary. Such an arrangement gives a correct reading of the distance traveled even though the styli are inaccurately disposed as much as one half of the width of a space from the center of the space.

The total distance traveled may also be read from the numbered dials on the cam wheels.

In the present invention, the readings are in miles, the right hand scale indicating units, the middle scale indicating tens and the left hand scale indicating hundreds. The scales will be hereinafter designated as the unit scale, the ten scale and the hundred scale respectively.

The record shown in Fig. 5 is interpreted as follows: The vehicle was started at 8 A. M. with the recorder reading zero mileage. A speed of 40 miles an hour was maintained until about 9:24. The velocity is calculated by determining the slope of the curve made by the first stylus on the unit scale; in the present instance it will be seen that the vehicle traveled 10 miles every fifteen minutes, therefore the velocity was 40 miles per hour. From 9:24 until 10 o'clock the vehicle remained stationary; this is shown by the straight, longitudinal line. The distance traveled from the start until the stopping point, may be read on the ten scale and unit scale. It will be seen that the vehicle traveled 56 miles before stopping, the line on the ten scale being in the "5" space and the line on the unit scale being in the "6" space.

The vehicle was started again at 10 o'clock and a speed of 20 miles an hour was maintained until 11 o'clock, at which time the speed was increased to 40 miles an hour. The vehicle was stopped at noon. The distance traveled up to 11 A. M. may be read on the ten scale and unit scale as 75 miles. At about 11:36 the vehicle had traveled a distance of 100 miles, as may be seen from a reference to the hundred scale on which the line shows that the stylus was moved from the "0" space to the "1" space. At noon the vehicle had traveled 115 miles, as may be seen from a reference to the three scales.

Although the device of the invention has been shown and described with particular reference to its use as a recorder of the travel of a vehicle, the invention is not limited to such a use. The invention may be employed to record the movement of any rotating bodies such as may be found in paper, textile, rubber or linoleum manufacturing machines, ship's logs, gas, water or electric meters or any other machines or devices having rotating or reciprocating members. The invention is not restricted to the use of a decimal system of multiplying gears as the ratios may be appropriately chosen to record displacement in other than decimal units, for example in inches, feet and fathoms.

I claim:

1. In a device for counting and recording the revolutions of a rotating body, the combination with a record element, and a stylus cooperating therewith, of means for reciprocating said stylus in contact with said record element in accordance with the rotation of said body, a second stylus, and means for reciprocating said second stylus in accordance with the reciprocation of said first stylus, said means comprising a multiplying connection between said styli whereby the number of reciprocations of said second stylus corresponding to any given number of revolutions of said body is a fractional part of the corresponding number of reciprocations of said first stylus.

2. In a recorder, a plurality of serially connected cams, a record element, a marker for each of said cams, and means for moving each marker in accordance with the movement of its respective cam.

3. In a device for recording the movement of a movable body, the combination with a movable record element, of a plurality of styli bearing on said record element and means including a multiplying connection between adjacent styli for moving said styli on the record element to graphically record the displacement of the moving body.

4. In apparatus for recording the displacement of a body on a time basis, the apparatus being of the type including two elements movable in accordance with respective functions of time and displacement, one element being a record sheet and the other a stylus, the combination of a record sheet, a stylus, means for moving said stylus with respect to said record sheet to trace a continuous time-displacement curve thereon, a second stylus for tracing a second time-displacement curve on said record sheet, and connecting means between said styli for intermittently advancing said second stylus for a predetermined movement of said first stylus.

5. In a device for continuously recording the movement of a vehicle, the combination with a record element, of a stylus bearing upon said element, and means actuated by the movement of said vehicle for moving said stylus across said strip in accordance with the movement of said vehicle, a second stylus and means for intermittently actuating said second stylus in accordance with the movement of said first stylus.

6. In a device for recording the movement of a body, the combination with a record element and a stylus bearing thereon, of means for moving said stylus in accordance with the movement of said body, a second stylus cooperating with said record element, and means for moving said second stylus in accordance with the movement of said first stylus.

7. In apparatus for recording the movement of a body, the combination with a record element, of means actuated by the travel of said body for making a continuous record of the units of travel of said body, and means actuated by said first means for making a continuous record of the total of said units of travel.

8. In a recorder for a moving body, the combination with a record element, of means active upon the movement of said body for tracing upon said record element a line having distinctive points thereon representing the units of travel of said body, and means actuated by said first means for tracing upon said record element a line representing the total of said distinctive points.

9. In a recorder, in combination, a drive shaft, a cam fixedly mounted on said drive shaft, a second cam loosely mounted on said drive shaft, means including reduction gearing interposed between said cams, a stylus mounted adjacent each of said cams and having a portion engaged by its respective cam, whereby each cam actuates its cooperating stylus.

10. In a device for recording the movement of a body, the device being of the type including a record element and means for continuously moving said record element at a uniform speed, the combination of a stylus, means mounting said stylus for movement back and forth across said record element in a direction transverse to the direction of movement of said record element, means actuated in accordance with the movement of said body for moving said stylus, a second stylus, means mounting the same for movement back and forth across said record element, and means active upon the movement of said first sylus through a predetermined number of cycles for advancing said second stylus one step in its movement across said strip.

11. The invention as set forth in claim 10, wherein said last means is active upon the completion of a predetermined number of cycles of movement of said first stylus to return said second stylus to its initial position.

12. The invention as set forth in claim 10, wherein said last means is active upon the completion of the travel of said second stylus to return the same to its initial position and wherein is provided a third stylus, means mounting the same for movement across said strip, and means for advancing said third stylus upon the completion of a predetermined number of cycles of movement of said second stylus.

13. In a device for recording the movement of a body, the device being of the type including a record element and means for continuously moving said record element at a uniform speed, the combination of a stylus, means mounting said stylus for reciprocatory movement transversely of the movement of said record element and in contact therewith, means including a grooved cam cooperating with said stylus mounting means for moving said stylus in accordance with the movement of said body, a second stylus, means mounting the same and means driven by said cam for actuating said second stylus intermittently.

PETRUS van SANTEN KOLFF.